O. E. BYRON.
TRAILER STEERING GEAR.
APPLICATION FILED OCT. 16, 1919.
1,427,513.
Patented Aug. 29, 1922.
3 SHEETS—SHEET 1.
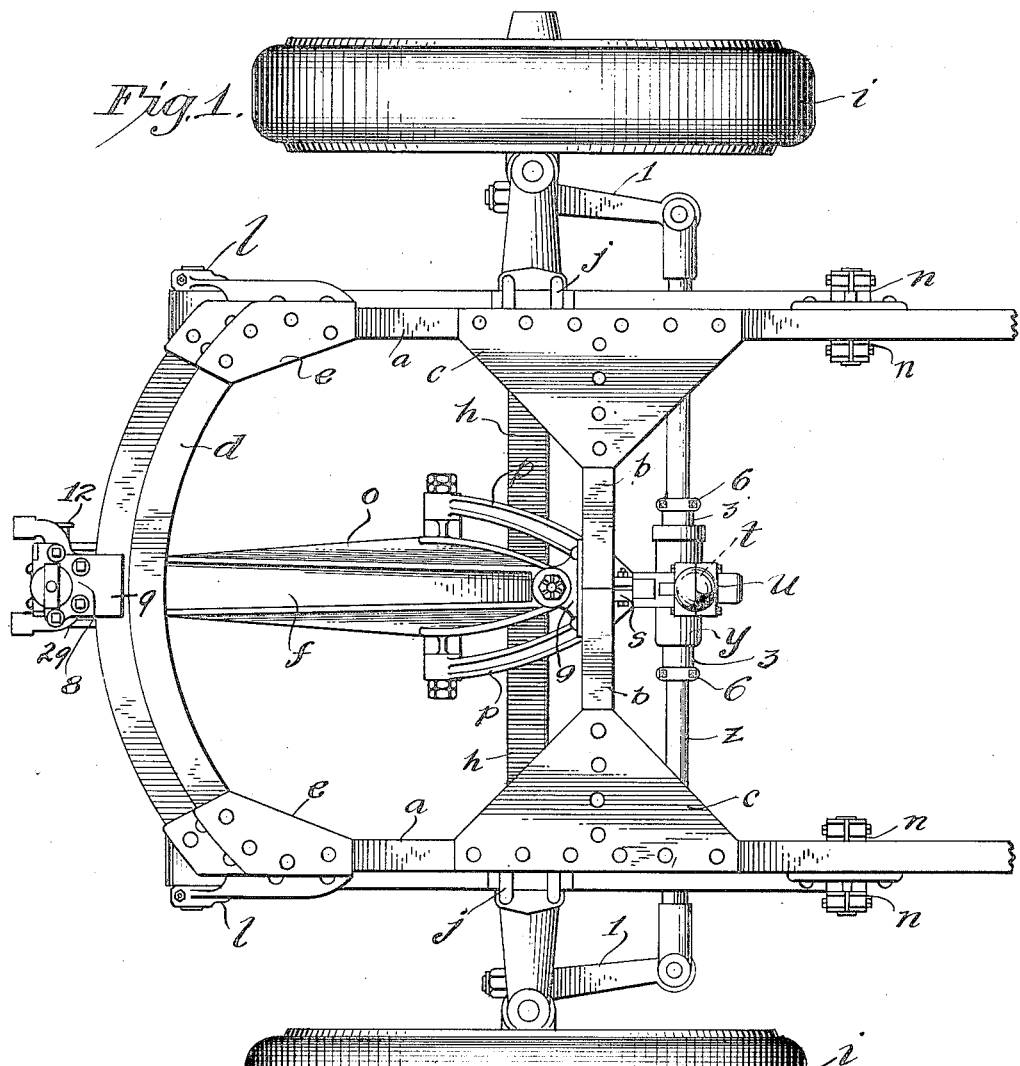
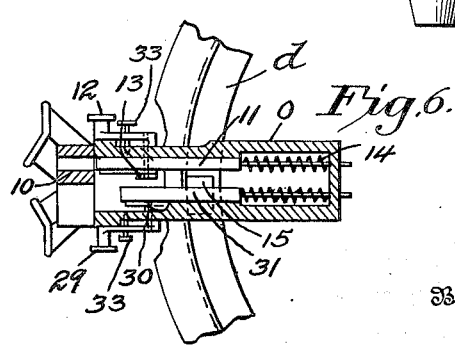

O. E. BYRON.
TRAILER STEERING GEAR.
APPLICATION FILED OCT. 16, 1919.

1,427,513.

Patented Aug. 29, 1922.
3 SHEETS—SHEET 2.

Inventor
Ora E. Byron
By Stuart C. Barnes
Attorney

UNITED STATES PATENT OFFICE.

ORRA E. BYRON, OF LOUISVILLE, KENTUCKY.

TRAILER STEERING GEAR.

1,427,513. Specification of Letters Patent. Patented Aug. 29, 1922.

Application filed October 16, 1919. Serial No. 331,016.

*To all whom it may concern:*

Be it known that I, ORRA E. BYRON, a citizen of the United States, residing at Louisville, in the county of Jefferson and State of Kentucky, have invented certain new and useful Improvements in Trailer Steering Gears, of which the following is a specification.

This invention relates to a trailer steering gear, and has for its object a trailer provided with steering gear arranged to allow the frame and running gear to assume relatively different positions due to the spring suspension without materially deflecting the wheels.

Another object is to provide a steering gear which, when actuated, allows a certain amount of yielding movement to take place between parts of the steering gear when the wheels are not free to turn, as when in a rut. This avoids bending the tie rod or the steering arms. These and other objects will more fully appear in the specification following.

In the drawings,—

Fig. 1 is a plan view of one end of the trailer.

Fig. 6 is a section on the line 6—6 of Fig. 2.

Figure 2:
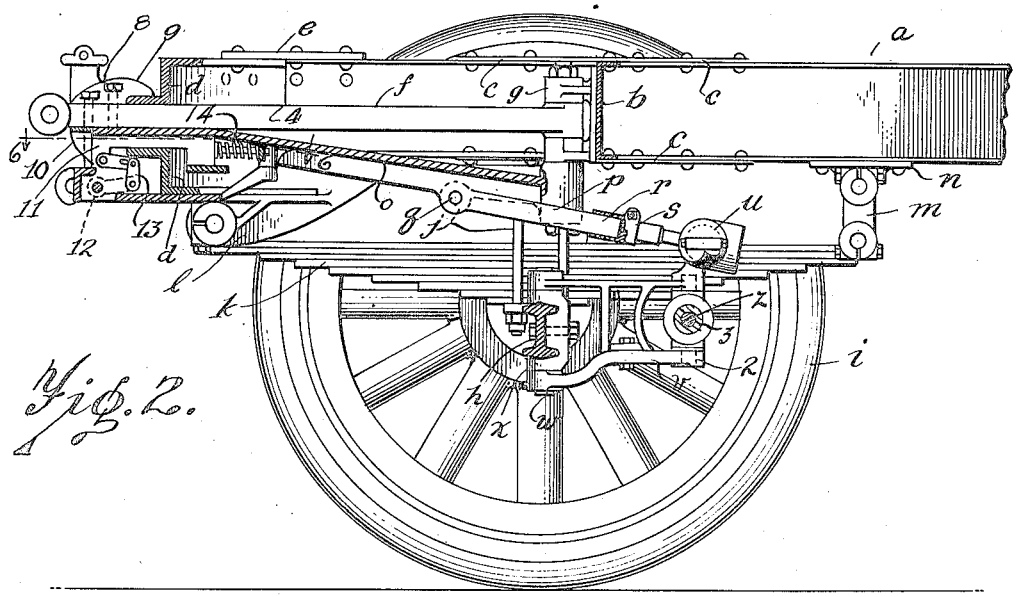
Fig. 2 is a vertical longitudinal section through one end of the trailer, on the line 2—2 of Fig. 4.

The trailer chassis or frame is of the usual channel iron construction with the side bars $a$ which are connected together by channel bars $b$ properly reinforced by the gussets $c$. On the ends a pair of segmental Z-bars $d$ are riveted to the side frame bars and reinforced by the gussets $e$. These segmental Z-bars will be broadly referred to as the end bars. They are spaced apart as shown in Fig. 2 to provide a segmental slot through which may swing the draw bar $f$ that swivels in the bracket $g$ attached to the cross bar $b$.

The runing gear comprises an axle $h$ of I section, and the wheels $i$. U bolts $j$ bolt the leaf springs $k$ to the axle. One end of the spring is pivotally supported in the bracket $l$ depending from the chassis, while the other end of the spring is supported by a shackle $m$ connected with the chassis through the bracket $n$.

Turning to Fig. 1, it will be seen that the draw bar $f$ is a channel bar pivoted to the bracket $g$ and it is free to swing in the segmental slot between the two Z-bars $d$. The upper steering lever is made up of the lever part $o$ which swivels on the bracket $g$ and the lever part or fork $p$ which is pivoted to swing on the upper lever part $o$ in a vertical plane by the pivots $q$. The stem of this fork has a slip joint $r$ in the sleeve $s$, the end of which is provided with a ball $t$ adapted to freely engage in the socket $u$. This socket is supported on a two-part yoke frame or lower steering lever $v$. This lower steering lever $v$ is a lever of the second order and supported to swivel in a horizontal plane by the pins $w$ carried on the bracket $x$ which is bolted to the axle $h$.

The sleeve $y$ encircles the tie bar $z$ that connects the two steering arms 1. This sleeve is provided with a pair of trunnions 2 projecting from the top and bottom, adapted to fit into the upper and lower parts of the yoke or lower steering lever $v$. Within in each end of the sleeve is a flanged tube 3, the flange of one tube 3 adapted to abut the turned-in lip 4 of the sleeve $y$, and the flange of the other sleeve 3 adapted to abut against the nut 5 which permits the tubes to be assembled in the sleeve. The abutments 6 limit the outward movement of the tube 3 and a coiled spring 7 presses the sleeves against the abutments 6 which are secured to the tie rod $z$.

It will be seen by referring to Fig. 2 that the upper steering lever is made up of the steering lever $o$, the fork $p$, the sleeve $s$ and the ball $t$, which is adapted to move the lower steering lever $v$ in a horizontal plane and the lower steering lever $v$ through the trunnions 2 is adapted to move the sleeve $y$ along the tie rod $z$ and thus move the tie rod after the yield in the spring 7 is taken up. Moving the sleeve in one direction picks up one flanged tube 3 and moving in the opposite direction the sleeve $y$ picks up the other flanged tube 3. If any obstruction makes difficult or prevents the turning of the wheels, then the spring 7 will be completely compressed before any undue strain is brought upon the tie rod and the steering arm ends. If, for instance, the wheels are in a rut in which they cannot turn and the unit that is drawing the trailer makes a turn which swings the draw bar and the steering levers, this action will not strain the steering gear, within a certain limit of movement, but the movement will be absorbed by the spring 7. This relieves the tie rod and the steering arms of considerable strains that might otherwise be directly communcated to them where the trailer is unable to follow the unit that is drawing it when that unit swings from side to side of the road. This is considered a very marked improvement over the trailer steering gear heretofore designed.

The ball $t$ and the ball socket $u$ are placed on a level with the top of the spring. Hence, when the axle tilts with respect to the frame ends, any movement of the axle with respect to the frame does not materially move the steering wheels. Where a simple swivelling joint is used at this place or where the ball is placed near the chassis between the two lever parts of the upper steering lever, as in prior constructions, it is so far away from the axis on which the axle tilts as to deflect the wheels when the axle tilts. My mounting of the universal joint on the running gear is considered quite an advantageous result in a vehicle of this type.

Figures 3, 5:
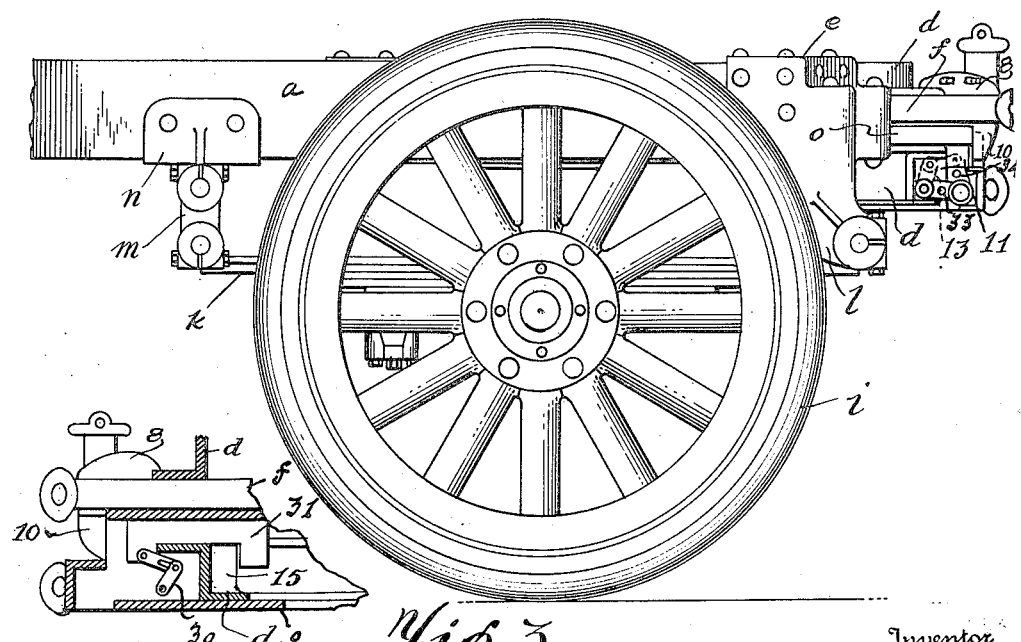
Fig. 3 is a vertical side elevation of one end of the trailer.
Fig. 5 is a section on the line 5—5 of Fig. 4.
Figure 4:
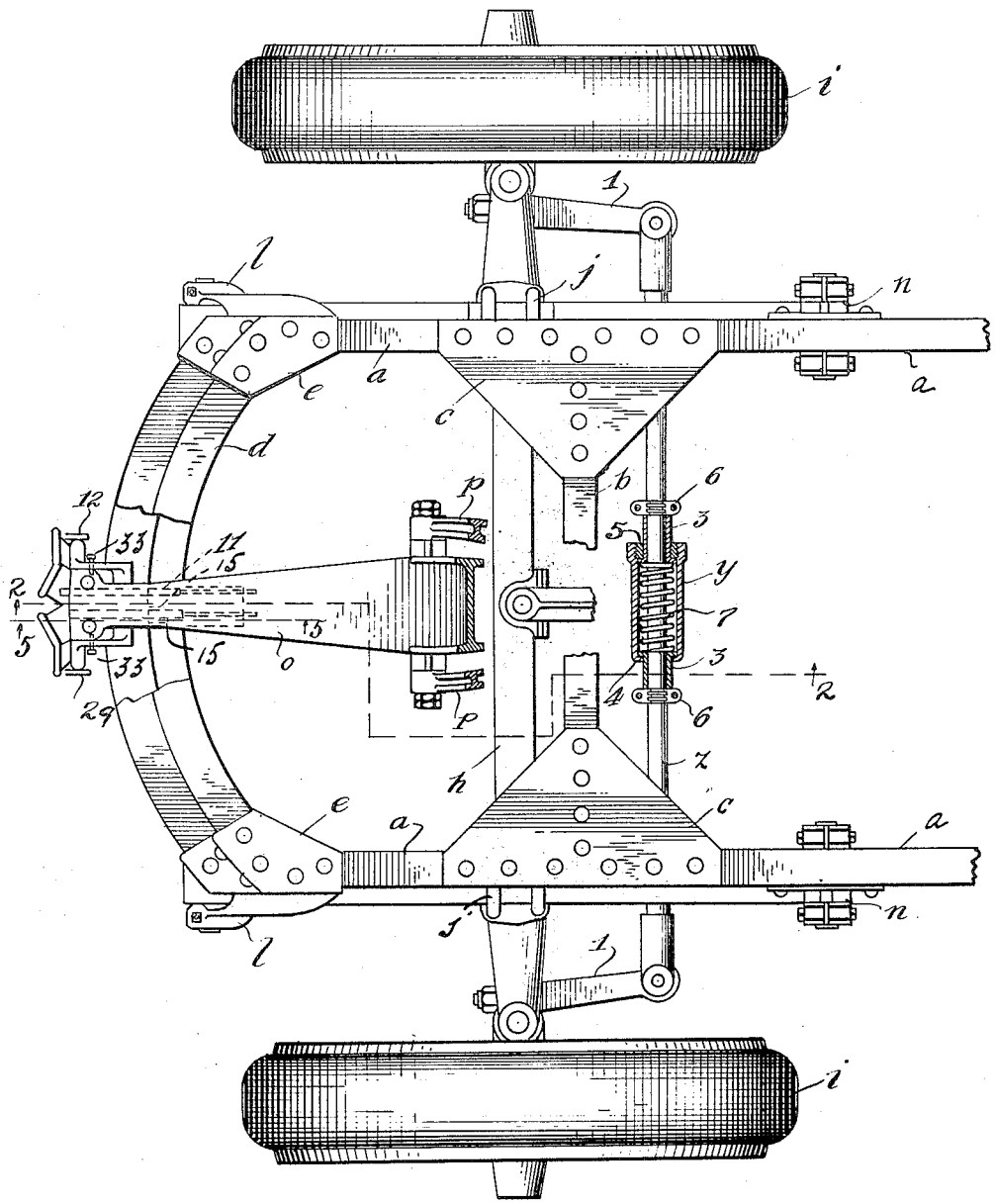
Fig. 4 is a plan view of one end of the trailer with the draw bar removed and some of the parts broken away to show the underneath construction.

The draw bar $f$ is provided with a block 8 that is bolted thereto and has a flange 9 that rides over the top of the bottom flange of the upper end or Z-bar $d$. The bottom of the block is provided with a fork 10 adapted to receive the end of the latch 11, as shown in Fig. 2. This locks the steering lever unit to the draw bar for the latch 11 is guided in the forward part of the steering lever $o$. A latch lever 12 is located on one side of the upper steering lever and may be swung to throw the crank arm 13 backward against the stress of the spring 14 coiled about the stem of the latch 11. In the position shown in Fig. 2 the latch is engaged with the fork 10 of the block 8. The steering levers are thus connected with the draw bar $f$. When the other latch lever 29 is drawn down the crank arm 30 (Fig. 5) is thrown to the left and the latch 31 engages in the lock recess 15 of the lower end bar and the steering lever $o$ is locked to the chassis. This locks both the draw bar and the steering levers against movement and in a central position, if the steering lever and draw bar are locked together by the latch 11. The steering wheels then cease to be steering wheels. This is desirable when this set of wheels is to be the rear wheels, the trailer being drawn from the opposite end. It is usual to provide each end of the trailer with steering gear so it is advisable to lock the end of the trailer happening to be the rear end of the trailer, and this latch effects this object. The latch levers 12 and 29 can be secured in either position by the pins 33 that can be inserted in the holes 34.

The steering gear can be taken in the claims as a broad reference to the steering levers, the rod $z$, steering arms 1, and the connections of these elements.

What I claim is:

1. In a trailer, the combination of a chassis frame, an axle and wheels, springs supporting the chassis frame upon the axle, and steering gear comprising a steering lever swivelled to the chassis frame and having upper and lower parts joined together by a knee, and a lower steering lever swivelled upon a vertical pivot upon the axle, and a universal joint between the upper and lower levers located in the middle of the vehicle when the wheels are parallel with the axis of the chassis frame and substantially on the level of the springs.

2. In a trailer, the combination of a chassis frame, runnig gear, spring suspension between the running gear and the chassis frame, and steering gear supported partly upon the running gear and partly on the chassis frame, said steering gear including a lower steering lever and an upper steering lever, said upper steering lever having an upper and lower lever part pivoted together, the latter having a slip joint that allows longitudinal movement of parts of such lever part, and a ball and socket joint between the upper and lower steering levers.

3. In a trailer, the combination of a chassis frame, running gear, spring suspension for the chassis frame upon the running gear, and steering gear supported in part upon the chassis frame and in part on the running gear, permitting vertical swivelling movement of parts and longitudinal movement of parts and having a universal joint supported upon the running gear in proximity to the axis about which the running gear turns in tilting movement and also a yieldable unit that permits a limited relative movement of parts of the steering gear when the wheels are subjected to twisting stresses from the road.

4. In a trailer, the combination of a chassis frame, running gear, spring suspension for the chassis frame upon the running gear, and steering gear supported in part upon the chassis frame and in part upon the running gear and including a yieldable unit comprising a pair of abutments, a pair of tubes forced against the abutments by a spring, and a sleeve connected with the power end of the steering gear and adapted to pick up one or the other of the tubes depending upon the direction of the steering impulse and communicate the steering effort to the resistance end of the steering gear through the said spring.

5. In a trailer, the combination of a chassis frame, running gear, spring suspension for the chassis frame upon the running gear, and steering gear mounted in part upon the chassis frame and in part upon the running gear including a yieldable unit comprising a sleeve supported pivotally upon the axle, a spring between the sleeve and the resisting end of the steering gear, said sleeve arranged to pick up one end of the spring when the impulse of steering is in one direction and the other end of the spring when the impulse is in the other direction, the steering effort being communicated to the resisting end of the steering gear through the said spring.

6. In a trailer, the combination of a chassis frame, running gear, a spring interposed between the chassis frame and the running gear, steering gear supported in part upon the chassis frame and in part upon the running gear and including a sleeve, a steering lever pivotally supported upon the axle for supporting the sleeve and jointed to the sleeve, a spring interposed between the sleeve and the resisting end of the steering gear adapted to have one end of the spring picked up by the sleeve when the steering impulse is in one direction and have the other end of the spring picked up by the sleeve when the steering impulse is in the other direction, the steering effort being communicated to the resisting end of the steering gear through the said spring.

7. In a trailer, the combination of a chassis frame, running gear, spring suspension for the chassis frame upon the running gear, steering gear mounted in part upon the chassis frame and in part upon the running gear and including a two-part upper steering lever and a lower steering lever and a ball and socket connection between the upper and lower levers, a sleeve supported upon the lower steering lever and a spring interposed betwen the sleeve and the resisting end of the steering gear adapted to have one end picked up when the sleeve moves in one direction and the other end picked up when the sleeve moves in the opposite direction to communicate the steering effort to the resisting end of the steering gear through the said spring.

8. In a trailer, the combination of a chassis frame, running gear, spring suspension for the chassis frame upon the running gear, and steering gear supported partly upon the chasis frame and partly upon the running gear and including an upper steering lever having two parts pivoted together and forming a lever of the first order and a lower steering lever supported by the running gear and jointed to the lower lever part of the upper steering lever by a universal joint.

9. In a trailer, the combination of a chassis frame, running gear, spring suspension supporting the chassis frame upon the running gear, and steering gear including an upper steering lever supported by the chassis frame and having jointed and sliding parts and a lower steering lever fulcrumed upon the running gear and a universal joint between the upper and lower steering levers.

10. In a trailer, the combination of a chassis frame, running gear, a spring suspension supporting the chassis frame upon the running gear, a draw bar swiveled upon the chassis frame, a steering lever pivotally supported, a connection between the draw bar and the steering lever so that lateral movement of the draw bar operates the steering lever, and a yieldable connection between the end of the steering lever and front wheel steering arm permitting a temporary relative movement of the steering lever with respect to the front wheel steering arm to take up undesired actuation due to relative movement between the axle and the chassis frame.

In testimony whereof I affix my signature.

ORRA E. BYRON.